US011605972B2

(12) United States Patent
Stauffer et al.

(10) Patent No.: US 11,605,972 B2
(45) Date of Patent: Mar. 14, 2023

(54) SMARTPHONE CHARGING STATION CONNECTIVITY

(71) Applicant: Google LLC, Mountain View, CA (US)

(72) Inventors: Erik Richard Stauffer, Sunnyvale, CA (US); Aamir Akram, San Jose, CA (US); Jibing Wang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/966,825

(22) PCT Filed: May 23, 2019

(86) PCT No.: PCT/US2019/033680
§ 371 (c)(1),
(2) Date: Jul. 31, 2020

(87) PCT Pub. No.: WO2019/231810
PCT Pub. Date: Dec. 5, 2019

(65) Prior Publication Data
US 2020/0403690 A1 Dec. 24, 2020

Related U.S. Application Data

(60) Provisional application No. 62/679,532, filed on Jun. 1, 2018.

(51) Int. Cl.
*H04B 7/00* (2006.01)
*H02J 13/00* (2006.01)
(Continued)

(52) U.S. Cl.
CPC ...... *H02J 13/00028* (2020.01); *G06F 13/382* (2013.01); *H02J 7/0044* (2013.01);
(Continued)

(58) Field of Classification Search
CPC . H04B 7/15578; H04B 7/0805; G06F 13/382; G06F 2213/0042; H04W 84/12; H04W 4/80
(Continued)

(56) References Cited

U.S. PATENT DOCUMENTS 7,447,922 B1 * 11/2008 Asbury ............... G06F 13/4282
713/300
9,911,011 B1 * 3/2018 Lin .......................... G06F 21/81
(Continued)

FOREIGN PATENT DOCUMENTS

| KR | 20130128801 | 11/2013 |
|---|---|---|
| KR | 101776690 | 9/2017 |
| WO | 2019231810 | 12/2019 |

OTHER PUBLICATIONS

"International Search Report and Written Opinion", PCT Application No. PCT/US2019/033680, dated Nov. 5, 2019, 26 pages.
(Continued)

*Primary Examiner* — April G Gonzales
(74) *Attorney, Agent, or Firm* — Colby Nipper PLLC

(57) ABSTRACT

This document describes methods, devices, and systems for configuring a smartphone (102) for network connectivity via a charging station (120), in which the smartphone (102) detects a connection or a coupling to the charging station (120). In response to the detection of the connection or coupling to the charging station (120), the smartphone (102) configures a WLAN transceiver (228) as a WLAN access point and forms a mesh WLAN network with one or more other WLAN access points (114). In other aspects, the charging station (120) detects the presence of the smartphone (102) that is connected or coupled to the charging station (120). In response to sensing the presence of the smartphone (102), the charging station (120) configures power and charging circuitry (244) to charge a battery of the
(Continued)

smartphone (102) and configures WLAN radio circuitry (232) to relay WLAN communications for the smartphone (102).

20 Claims, 5 Drawing Sheets

(51) Int. Cl.
*G06F 13/38* (2006.01)
*H04B 7/08* (2006.01)
*H04B 7/155* (2006.01)
*H04W 84/12* (2009.01)
*H02J 7/00* (2006.01)
*H04W 4/80* (2018.01)

(52) U.S. Cl.
CPC ...... *H02J 13/00007* (2020.01); *H04B 7/0805* (2013.01); *H04B 7/15578* (2013.01); *H04W 84/12* (2013.01); *G06F 2213/0042* (2013.01); *H02J 2310/22* (2020.01); *H04W 4/80* (2018.02)

(58) Field of Classification Search
USPC .......................................................... 455/24
See application file for complete search history.

(56) References Cited

U.S. PATENT DOCUMENTS

| | | | |
|---|---|---|---|
| 10,903,894 B1* | 1/2021 | Dash | H04B 7/2606 |
| 2007/0070958 A1* | 3/2007 | Rinne | H04L 63/0892 |
| | | | 370/338 |
| 2007/0201402 A1* | 8/2007 | Cho | H04B 7/155 |
| | | | 370/330 |
| 2013/0238819 A1* | 9/2013 | Oljaca | G06F 13/4081 |
| | | | 710/313 |
| 2015/0256965 A1* | 9/2015 | Kobayashi | H04M 1/00 |
| | | | 455/11.1 |
| 2016/0088468 A1* | 3/2016 | Sharma | H04M 15/93 |
| | | | 370/329 |
| 2016/0337892 A1* | 11/2016 | Lo | H04W 24/08 |
| 2017/0357803 A1* | 12/2017 | Amarilio | G06F 1/28 |
| 2018/0046429 A1* | 2/2018 | Jensen | G06F 13/426 |
| 2018/0081843 A1* | 3/2018 | Kadgi | G06F 1/266 |
| 2022/0191967 A1* | 6/2022 | Wang | H04W 88/04 |

OTHER PUBLICATIONS

"Invitation to Pay Additional Fees", PCT Application No. PCT/US2019/033680, dated Sep. 9, 2019, 17 pages.

"International Preliminary Report on Patentability", Application No. PCT/US2019/033680, dated Dec. 10, 2020, 18 pages.

* cited by examiner

SMARTPHONE CHARGING STATION CONNECTIVITY

BACKGROUND

The evolution of wireless communication to fifth generation (5G) standards and technologies provides higher data rates and greater capacity, with improved reliability and lower latency, which enhances mobile broadband services. 5G technologies also provide new classes of services for vehicular networking, fixed wireless broadband, and the Internet of Things (IoT).

A unified air interface, which utilizes licensed, unlicensed, and shared license radio spectrum in multiple frequency bands is one aspect that enables the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband.

The wide channel bandwidths in the radio spectrum of the above 6 GHz band provide broadband-quality data rates. Conventional tethering or hotspot solutions for smartphones limit the capabilities to utilize these data rates.

SUMMARY

This summary is provided to introduce simplified concepts of smartphone charging station connectivity. The simplified concepts are further described below in the Detailed Description. This summary is not intended to identify essential features of the claimed subject matter, nor is it intended for use in determining the scope of the claimed subject matter.

In some aspects methods, devices, and systems for configuring a charging station for network connectivity for a smartphone are described, in which a charging station detects the presence of the smartphone that is connected or coupled to the charging station. In response to sensing the presence of the smartphone, the charging station configures power and charging circuitry to charge a battery of the smartphone, configures WLAN radio circuitry to relay WLAN communications for the smartphone, and relays WLAN communication between the smartphone and a wireless local area network.

In other aspects, methods, devices, and systems for configuring a smartphone for network connectivity via a charging station are described, in which the smartphone detects a connection or a coupling to the charging station. In response to the detection of the connection or coupling to the charging station, the smartphone configures a wireless local area network (WLAN) transceiver as a WLAN access point and relays WLAN communication with a wireless local area network using the charging station.

BRIEF DESCRIPTION OF THE DRAWINGS

Aspects of smartphone charging station connectivity are described with reference to the following drawings. The same numbers are used throughout the drawings to reference like features and components.

DETAILED DESCRIPTION

Overview

Figure 1:
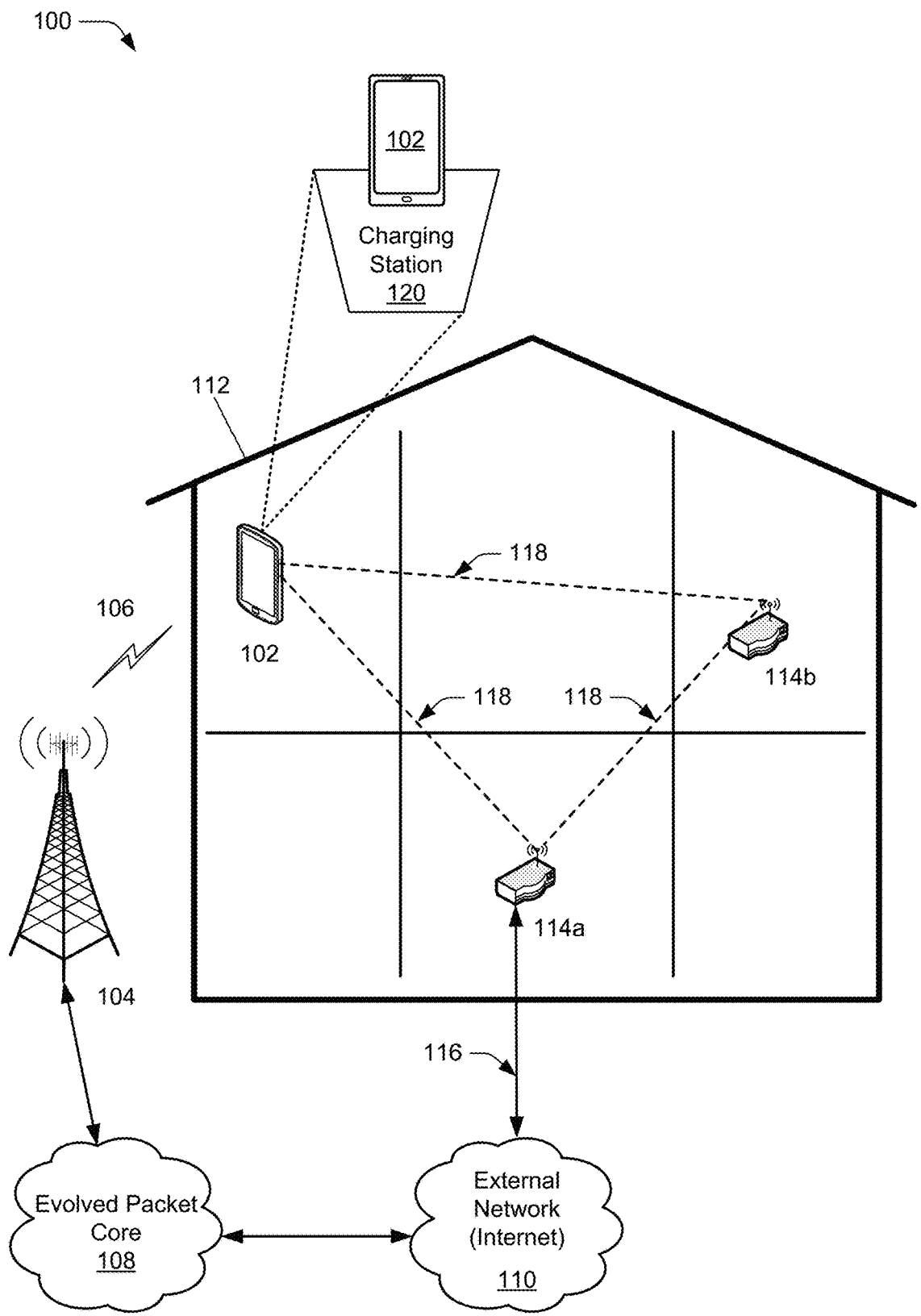
FIG. 1 illustrates an example wireless network environment in which various aspects of a smartphone charging station connectivity can be implemented.

This document describes techniques using, and devices enabling, a user device (e.g., a smartphone, a user equipment) and a charging station to provide enhanced wireless connectivity for a user. The smartphone and charging station can improve the quality of wireless local area network (WLAN) (e.g., Wi-Fi) connectivity for the user or provide additional connectivity to increase the bandwidth or reliability of a user's wired broadband service. Fifth Generation New Radio (5G NR) technologies provide wide channel bandwidths to support higher data rates for wireless broadband than those provided by many wireline broadband technologies. In addition to 5G NR, Long Term Evolution (LTE), High Speed Packet Access (HSPA), Wideband-Code Division Multiple Access (W-CDMA), or other radio access technologies implemented in the smartphone can be used to improve connectivity options for the user.

In aspects, tethering or wireless hotspot capabilities of the smartphone can be configured to turn on automatically when the smartphone senses that it is connected or coupled to the charging station. When the smartphone senses that it is no longer connected or coupled to the charging station, the smartphone can be configured to turn off the hot spot capabilities of the smartphone to conserve battery capacity of the smartphone. For example, the smartphone senses that it is connected or coupled to the charging station based on sensing a wired connection to the charging station, such as via Universal Serial Bus (USB) connection, a wireless connection, such as Near Field Communication (NFC) or Bluetooth, or sensing that wireless charging has started.

In additional aspects, the smartphone can be configured to form or join a mesh network when the smartphone senses that it is connected or coupled to the charging station. For example, the smartphone senses that it is connected or coupled to the charging station and forms a mesh network with one or more WLAN routers of the user improving the reliability and/or range of the mesh WLAN network. The smartphone may be configured as a router (e.g., access point) to route data from the mesh WLAN network to the Internet using the cellular connection of the smartphone. Alternatively, the smartphone may be configured to use the broadband connection of another router in the WLAN network and not use the cellular connection of the smartphone for data connections to utilize a higher throughput or lower cost of the broadband connection.

In another example, the smartphone senses that it is connected or coupled to the charging station and joins an existing mesh WLAN network with one or more WLAN routers. In a further example, the smartphone senses that it is connected or coupled to the charging station and joins other wireless mesh networks such as Bluetooth Mesh™, ZigBee™, Thread™, or IEEE 802.15.4, to increase the reliability and range of the respective wireless mesh networks.

In a further aspect, the smartphone and the charging station provide the user with flexible options for managing backhaul connections, including increasing available bandwidth by aggregating multiple backhauls, increasing reliability by providing failover between backhaul connections, application-based backhaul selection, and the like. For example, the cellular backhaul (e.g., 5G NR, LTE, HSPA, etc.) of the smartphone can be aggregated with wireline broadband (e.g., cable, fiber, or Digital Subscriber Line) to provide increased bandwidth to give the user a higher data rate for data transmission and reception. In another example, the smartphone and the broadband router of the user can be configured to improve reliability, such as configuring the smartphone as a backup broadband router to provide redundant backhaul. If the broadband router fails or the connection of the broadband router fails, routing of data traffic transfers over to the smartphone that provides backhaul using its cellular connection.

In other aspects, aggregation or failover can be configured locally at the smartphone and/or broadband router or remotely, such as at a cloud-based proxy server. For example, the user may configure the smartphone and broadband router to provide backhaul on a per-application or a per-protocol basis. In another example, the user may use a remote proxy server to manage routing or to manage traffic flows in an aggregation of the communication channels provided via the smartphone and the broadband router.

In further aspects, the charging station can improve the WLAN performance of the smartphone. By coupling or connecting the smartphone to additional circuitry, such as a power amplifier, a low-noise amplifier, transmit-receive switches, and/or antennas in the charging station, the WLAN performance, such as transmit power, effective radiated power, antenna gain, antenna efficiency, antenna diversity, spatial diversity, receive sensitivity, and the like, can be improved to extend the range, reliability, and/or throughput of WLAN traffic. For example, the charging station includes WLAN radio circuitry that can be configured as a repeater or range extender for WLAN signals to and from the smartphone. The WLAN radio circuitry may be configured to default to a receiving mode of operation in which received WLAN signals are routed by the transmit-receive switches through the low-noise amplifier to be amplified for the WLAN receiver in the smartphone. The WLAN radio circuitry includes circuitry to sense a WLAN transmission by the smartphone and switches, using the transmit-receive switches, the WLAN radio circuitry of the charging station to a transmitting mode of operation to amplify transmitted WLAN signals from the smartphone using a power amplifier. The WLAN radio circuitry senses when the WLAN transmission by the smartphone stops and returns the WLAN circuitry to the receiving mode, which routes received signals through the low-noise amplifier to the smartphone. In another example, the smartphone includes a WLAN radio and based on the smartphone sensing that it is coupled or connected to the charging station, the smartphone routes data for WLAN transmission or reception through the WLAN radio of the charging station via a wired (e.g., USB) or wireless connection (e.g., NFC or Bluetooth).

In an additional aspect, the charging station includes a 5G NR femtocell, such as a 5G NR femtocell that operates at mmWave frequencies. For example, the 5G NR femtocell relays cellular communication with the smartphone to other devices at 5G NR mmWave frequency bands. In another example, the charging station includes a WLAN transceiver and the 5G NR femtocell to provide 5G NR coverage within a structure using the broadband connection of the WLAN network.

In a further aspect, the charging station includes a housing with mechanical features to enable mounting the charging station to a window to provide improved mmWave propagation outside a building structure. For example, and as discussed in greater detail below with respect to FIG. 3, the charging station includes mechanical features to enable mounting the charging station to a window, such as adhesive tape, suction cups, or the like.

Example Environment

FIG. 1 illustrates an example environment 100 which includes a smartphone 102 (user device 102, user equipment 102) that communicates with a base station 104, through a wireless communication link 106 (wireless link 106). In this example, the user device 102 is implemented as a smartphone. Although illustrated as a smartphone, the user device 102 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base station 104 (e.g., an Evolved Universal Terrestrial Radio Access Network Node B, E-UTRAN Node B, evolved Node B, eNodeB, eNB, Next Generation Node B, gNode B, gNB, and the like) may be implemented in a macrocell, microcell, small cell, picocell, and the like, or any combination thereof.

The base station 104 communicates with the user device 102 via the wireless link 106, which may be implemented as any suitable type of wireless link. The wireless link 106 can include a downlink of data and control information communicated from the base station 104 to the user device 102, an uplink of other data and control information communicated from the user device 102 to the base station 104, or both. The wireless link 106 may include one or more wireless links or bearers implemented using any suitable communication protocol or standard, or combination of communication protocols or standards such as 3rd Generation Partnership Project Long-Term Evolution (3GPP LTE), 5G NR, and so forth. The base station 104 is connected via an Evolved Packet Core 108 (EPC 108) to public networks, such as the Internet 110.

Within the structure 112 of the user, broadband connectivity is provided via one or more WLAN routers 114 (illustrated as 114*a* and 114*b*). For example, WLAN router 114*a* includes a modem for a broadband connection 116, to an external network, such as Digital Subscriber Loop (DSL), fiber, or cable broadband. Alternatively, the modem may be external to the WLAN router 114 and connected via a suitable interface, such as Ethernet. Broadband connectivity within and around the structure is provided by the WLAN signals 118.

When the smartphone 102 connects to a charging station 120, the smartphone 102 activates its WLAN hotspot capabilities to connect to the WLAN network in the structure 112. The smartphone 102 and the charging station 120 can join an existing WLAN network, join an existing mesh WLAN network, or form a new mesh WLAN network.

Figure 2:
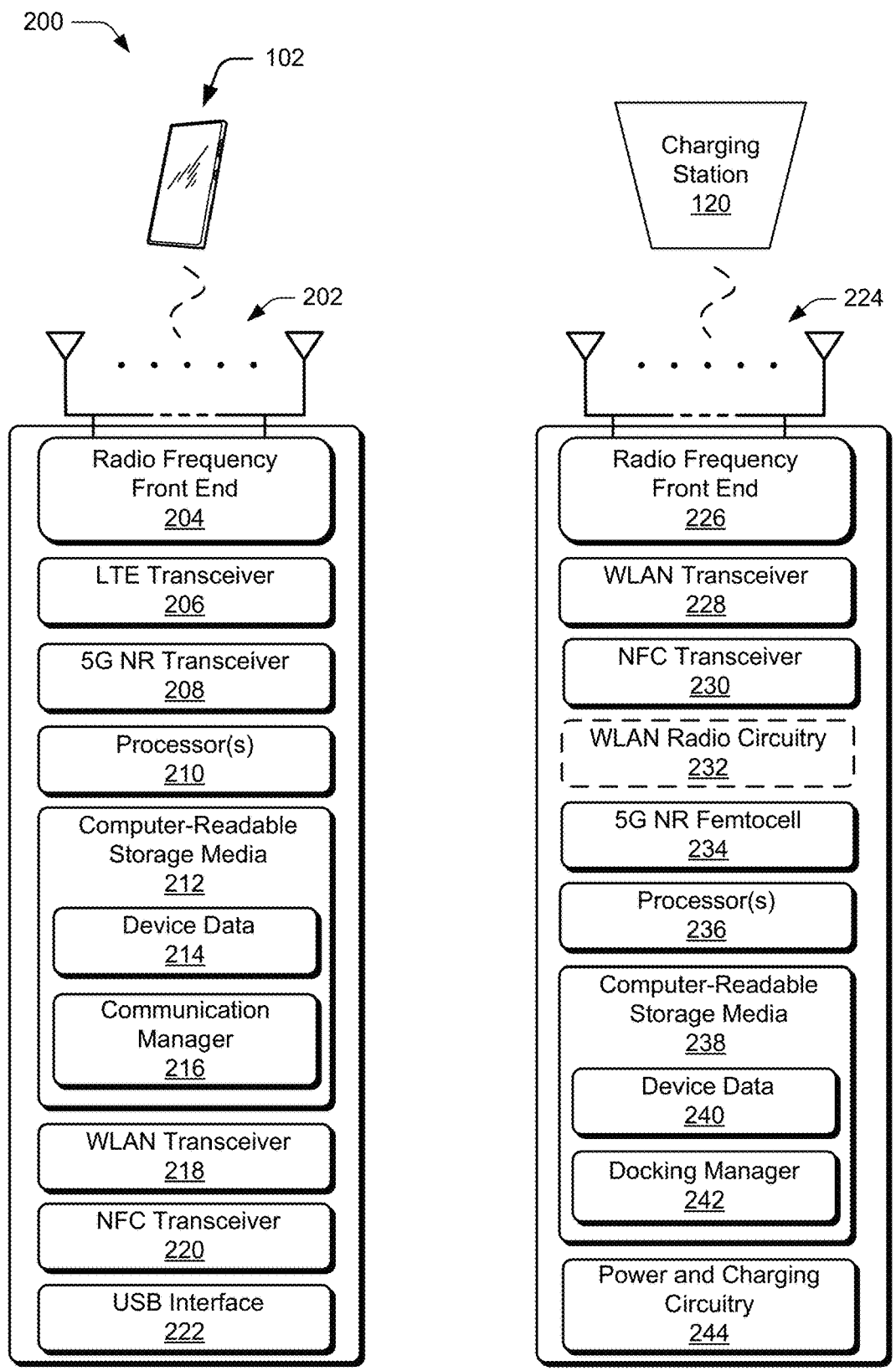
FIG. 2 illustrates an example device diagram that can implement various aspects of smartphone charging station connectivity.

FIG. 2 illustrates an example device diagram 200 of the smartphone 102, and the charging station 120. The smartphone 102 and the charging station 120 may include additional functions and interfaces that are omitted from FIG. 2 for the sake of clarity. The smartphone 102 includes antennas 202, a radio frequency front end 204 (RF front end 204), an LTE transceiver 206, and a 5G NR transceiver 208 for communicating with base stations 104. The RF front end 204 of the smartphone 102 can couple or connect the LTE transceiver 206, and the 5G NR transceiver 208 to the antennas 202 to facilitate various types of wireless communication. The antennas 202 of the smartphone 102 may include an array of multiple antennas that are configured similar to or differently from each other. The antennas 202 and the RF front end 204 can be tuned to, and/or be tunable to, one or more frequency bands defined by the 3GPP LTE, 5G NR, IEEE 802.11, and/or NFC communication standards and implemented by the LTE transceiver 206, and/or the 5G NR transceiver 208. Additionally, the antennas 202, the RF front end 204, the LTE transceiver 206, and/or the 5G NR transceiver 208, may be configured to support beamforming for the transmission and reception of communications with the base station 104. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The smartphone 102 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the smartphone 102. The device data 214 includes user data, multimedia data, applications, and/or an operating system of the smartphone 102, which are executable by processor(s) 210 to enable user interaction with the smartphone 102.

CRM 212 also includes a communication manager 216, which, in one implementation, is embodied on the CRM 212 (as shown). Alternately or additionally, the communication manager 216 may be implemented in whole or part as hardware logic or circuitry integrated with or separate from other components of the smartphone 102. In at least some aspects, the communication manager 216 configures the RF front end 204, the LTE transceiver 206, the 5G NR transceiver 208, a WLAN transceiver 218, an NFC transceiver 220, and/or a USB interface 222 to implement the techniques for smartphone charging station connectivity described herein. Additionally, or optionally, the smartphone 102 may include other wireless transceivers, such as a Bluetooth™ transceiver, a ZigBee™ transceiver, and/or an IEEE 802.15.4 transceiver.

The device diagram for the charging station 120, shown in FIG. 2, includes antennas 224, a radio frequency front end 226 (RF front end 226), a WLAN transceiver 228, an NFC transceiver 230 for communicating with the smartphone 102. Alternatively, the WLAN transceiver 228 may be replaced by WLAN radio circuitry 232 that is coupled to the WLAN transceiver 218 of the smartphone 102 to improve the performance characteristics of the WLAN transceiver 218. Optionally or additionally, the charging station 120 includes a 5G NR femtocell 234. The RF front end 226 of the charging station 120 can couple or connect the WLAN transceiver 228, the NFC transceiver 230, the WLAN radio circuitry 232 and the 5G NR femtocell 234 to the antennas 224 to facilitate various types of wireless communication. The antennas 224 of the charging station 120 may include an array of multiple antennas that are configured similar to or differently from each other. The antennas 224 and the RF front end 226 can be tuned to, and/or be tunable to, one or more frequency band defined by the 3GPP LTE and 5G NR communication standards, NFC communication standards, WLAN communication standards, and implemented by the WLAN transceiver 228, the NFC transceiver 230, the WLAN radio circuitry 232, and/or the 5G NR femtocell 234. Additionally, the antennas 224, the RF front end 226, the WLAN transceiver 228, the WLAN radio circuitry 232, and/or the 5G NR femtocell 234 may be configured to support beamforming, for the transmission and reception of communications. For example, the antennas 224 may provide a greater antenna gain for WLAN signals than the WLAN antennas included in the smartphone 102.

The charging station 120 also includes processor(s) 236 and computer-readable storage media 238 (CRM 238). The processor 236 may be a single core processor or a multiple core processor composed of a variety of materials, such as silicon, polysilicon, high-K dielectric, copper, and so on. CRM 238 may include any suitable memory or storage device such as random-access memory (RAM), static RAM (SRAM), dynamic RAM (DRAM), non-volatile RAM (NVRAM), read-only memory (ROM), or Flash memory useable to store device data 240 of the charging station 120. The device data 240 includes applications, and/or an operating system of the charging station 120, which are executable by processor(s) 236 to enable communication with the smartphone 102.

CRM 238 also includes a docking manager 242, which, in one implementation, is embodied on CRM 238 (as shown). Alternately or additionally, the docking manager 242 may be implemented in whole or part as hardware logic or circuitry integrated with or separate from other components of the charging station 120. In at least some aspects, the docking manager 242 configures the WLAN transceiver 228, the NFC transceiver 230, the WLAN radio circuitry 232, and/or the 5G NR femtocell 234 for communication with the smartphone 102. The docking manager 242 configures power and charging circuitry 244 to charge a battery of the smartphone 102 via a wired charging connection or wireless charging.

Figure 3:
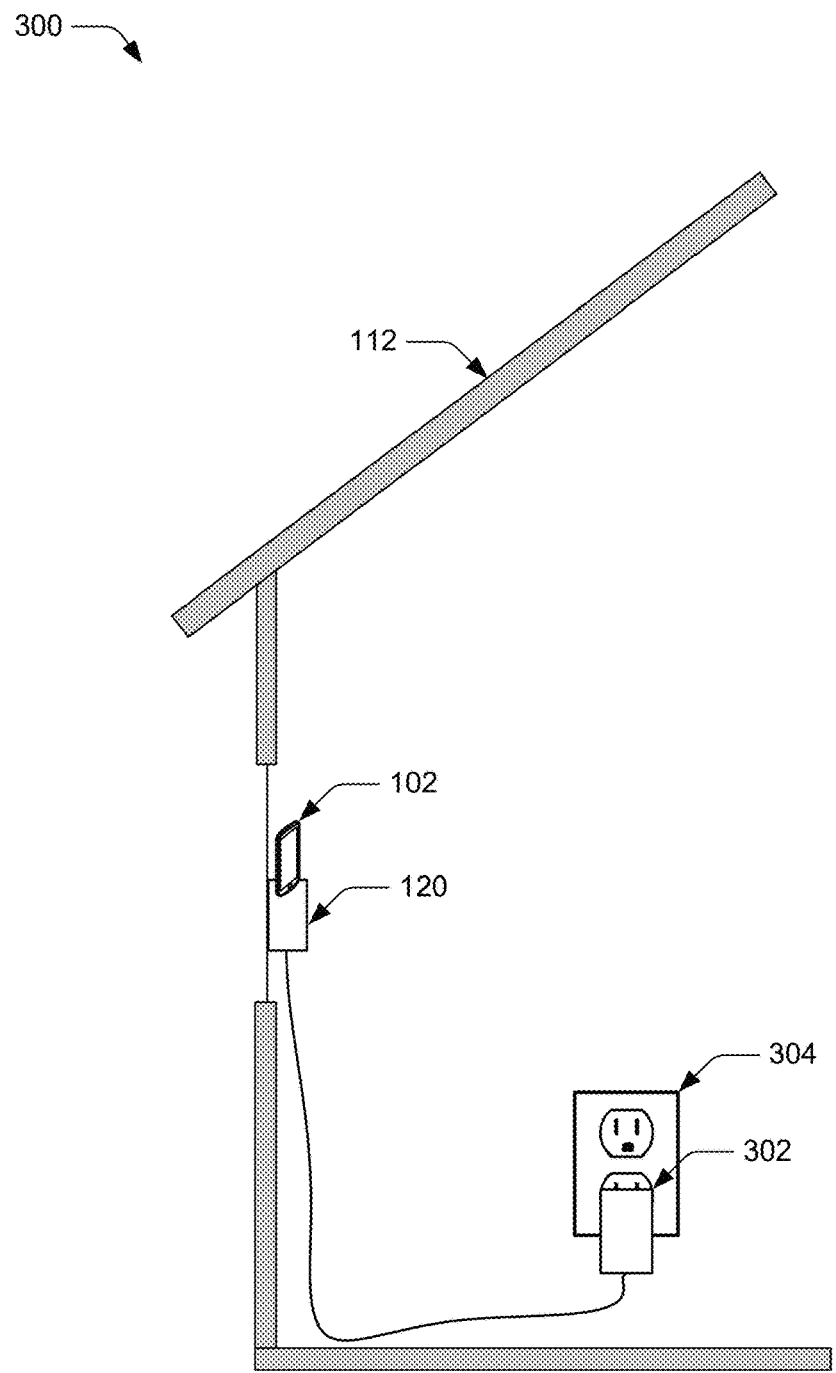
FIG. 3 illustrates an example environment for of mounting a charging station on a window in accordance with various aspects of smartphone charging station connectivity techniques described herein.

FIG. 3 illustrates an example environment for mounting the charging station 120 on a window in accordance with various aspects of smartphone charging station connectivity. The charging station 120 includes mechanical features to enable mounting the charging station to a window in the structure 112 to improve reception of radio signals at mmWave frequencies that are more attenuated by other building materials. The charging station 120 may be mounted to the window using magnets, adhesive, adhesive tape, suction cups, snaps, or the like. The charging station 120 receives power from a power supply 302, which is powered from mains power 304 of the structure 112.

Example Methods

Example methods 400 and 500 are described with reference to FIGS. 4 and 5 in accordance with one or more aspects of smartphone charging station connectivity. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
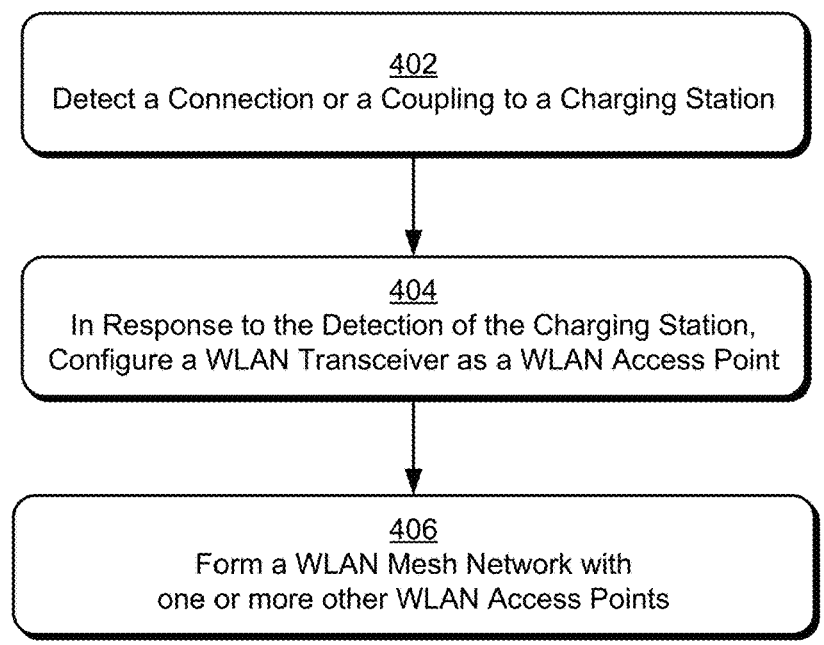
FIG. 4 illustrates an example method of smartphone charging station connectivity in accordance with aspects of the techniques described herein.

FIG. 4 illustrates example method(s) 400 of smartphone charging station connectivity as generally related to configuring the WLAN transceiver of a smartphone based on the detection of a charging station. At block 402, a user device detects a connection or a coupling to a charging station. For example, the smartphone 102 determines that it is connected via a wired connection or coupled by a wireless connection to the charging station 120.

At block 404, in response to the detection of the charging station by the user device, the user device configures a WLAN transceiver of the user device as a WLAN access point. For example, in response to detecting the charging station 120, the smartphone 102 configures the WLAN transceiver 218 as a WLAN access point.

At block 406, the user device forms a mesh WLAN network with one or more other WLAN access points. For example, the smartphone 102 forms a mesh WLAN network with other WLAN access points 114 in the structure 112.

Figure 5:
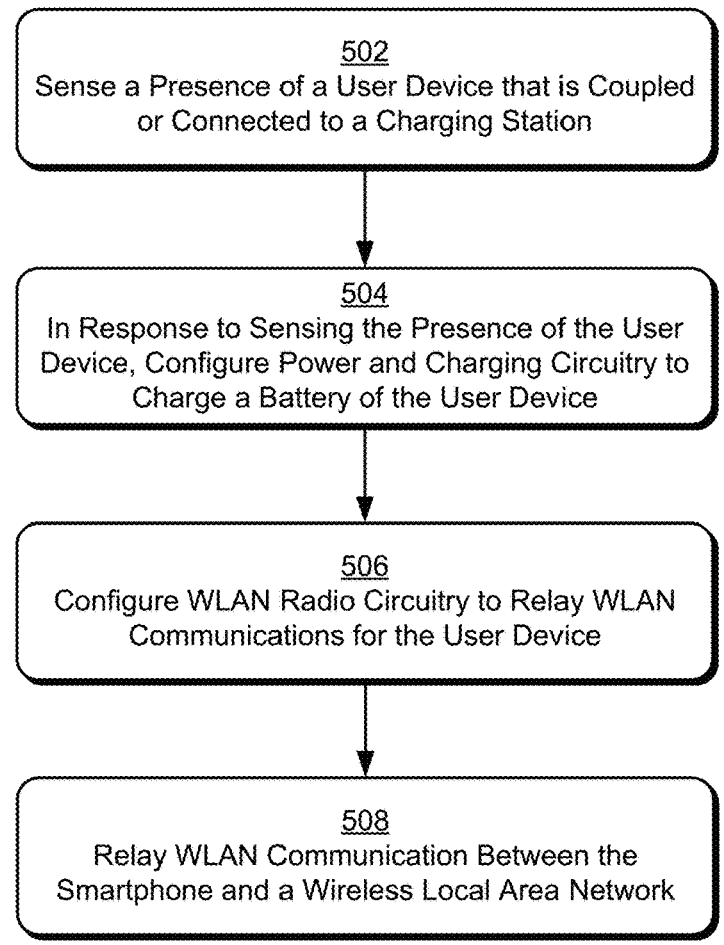
FIG. 5 illustrates an example method of smartphone charging station connectivity in accordance with aspects of the techniques described herein.

FIG. 5 illustrates example method(s) 500 of smartphone charging station connectivity as generally related to a charging station relaying WLAN signals for a smartphone. The order in which the method blocks are described are not intended to be construed as a limitation, and any number of the described method blocks can be combined in any order to implement a method, or an alternate method.

At block 502, a charging station senses the presence of a user device. For example, the charging station 120 senses the presence of the smartphone 102 via a wired or wireless connection being formed between the charging station 120 and the smartphone 102.

At block 504, in response to sensing the presence of the user device, the charging station configures the power and charging circuitry to charge a battery of the user device. For example, in response to sensing the presence of the smartphone 102, the charging station 120 configures the power and charging circuitry 244 to charge the battery of the smartphone 102 using wired or wireless charging.

At block 506, the charging station configures WLAN radio circuitry of the charging station to relay WLAN communications for the user device. For example, charging station 120 configures the WLAN transceiver 228 or the WLAN radio circuitry 232 to relay WLAN communications for the smartphone 102.

At block 508, the charging station relays WLAN communications for the smartphone. For example, charging station 120 uses the WLAN transceiver 228 or the WLAN radio circuitry 232 to relay WLAN communications for the smartphone 102.

In the following some examples are described—
Example 1: A charging station device, comprising:
 wireless local area network (WLAN) radio circuitry;
 power and charging circuitry;
 a processor; and a memory comprising instructions for a docking manager application, the instructions being executable by the processor to configure the charging station to:
  sense a presence of a smartphone that is coupled or connected to the charging station;
  in response to sensing the presence of the smartphone, configure the power and charging circuitry to charge a battery of the smartphone;
  configure the WLAN radio circuitry to relay WLAN communications for the smartphone; and
  relay WLAN communication between the smartphone and a wireless local area network.

Example 2: The charging station device of example 1, wherein the WLAN radio circuitry comprises one or more antennas, a low-noise amplifier, one or more transmit-receive switches, a power amplifier, or any combination thereof.

Example 3: The charging station device of example 2, wherein the WLAN radio circuitry comprises a WLAN signal sensor to sense a WLAN transmission from the smartphone, and the instructions being executable by the processor to configure the charging station device to:
 in response to the sensing of the WLAN transmission from the smartphone, configure the one or more transmit-receive switches to route the WLAN transmission from the smartphone through the power amplifier; and
 in response to not sensing the WLAN transmission from the smartphone, configure the one or more transmit-receive switches to route signals received by the one or more antennas through the low-noise amplifier.

Example 4: The charging station device of either example 2 or example 3, wherein the one or more antennas are configured to provide a greater antenna gain than WLAN antennas included in the smartphone.

Example 5: The charging station device of any one of examples 1 to 4, further comprising a housing, wherein the housing includes mechanical features to mount the device to a window to improve transmission and reception of millimeter wave radio signals, and wherein the mechanical features of the housing are configured to enable mounting the charging station using magnets, adhesive, adhesive tape, suction cups, or snaps.

Example 6: The charging station device of any one of examples 1 to 5, wherein the WLAN radio circuitry comprises a WLAN transceiver and one or more antennas, and the instructions being executable by the processor to configure the charging station device to:
 send and receive data for the smartphone using the WLAN transceiver and the one or more antennas.

Example 7: The charging station device of example 6, wherein the data is communicated between the charging station and the smartphone via a USB interface, a Near Field Communication link, or a Bluetooth communication link.

Example 8: The charging station device of example 6, further comprising a Fifth Generation New Radio (5G NR) femtocell, and the instructions being executable by the processor to configure the charging station to:
 provide 5G NR wireless communication via a cellular backhaul of the smartphone, a WLAN network, or a combination thereof.

Example 9: A method relaying wireless local area network (WLAN) communication by a charging station, the method comprising:
 sensing, by the charging station, a presence of a smartphone that is coupled or connected to the charging station;

in response to the sensing the presence of the smartphone, configuring power and charging circuitry to charge a battery of the smartphone;

configuring WLAN radio circuitry of the charging station to relay WLAN communication for the smartphone; and relaying WLAN communication between the smartphone and a wireless local area network.

Example 10: The method of example 9, wherein the WLAN radio circuitry comprises one or more antennas, a low-noise amplifier, one or more transmit-receive switches, a power amplifier, or any combination thereof.

Example 11: The method of example 10, wherein the WLAN radio circuitry comprises a WLAN signal sensor to sense a WLAN transmission from the smartphone, the method further comprising:

in response to the sensing of the WLAN transmission from the smartphone, configuring the one or more transmit-receive switches to route the WLAN transmission from the smartphone through the power amplifier; and in response to not sensing the WLAN transmission from the smartphone, configuring the one or more transmit-receive switches to route signals received by the one or more antennas through the low-noise amplifier.

Example 12: The method of either example 10 or example 11, wherein the one or more antennas are configured to provide a greater antenna gain than WLAN antennas included in the smartphone.

Example 13: The method of any of examples 9 to 12, wherein the WLAN radio circuitry comprises a WLAN transceiver and one or more antennas, the method further comprising:

sending and receiving data for the smartphone using the WLAN transceiver and the one or more antennas.

Example 14: The method of example 13, wherein the data is communicated between the charging station and the smartphone via a USB interface, a Near Field Communication link, or a Bluetooth communication link.

Example 15: The method of example 14, wherein the charging station further comprises a Fifth Generation New Radio (5G NR) femtocell, the method further comprising:

providing 5G NR wireless communication via a cellular backhaul of the smartphone, a WLAN network, or a combination thereof.

Example 16: A smartphone device comprising:
  a wireless local area network (WLAN) transceiver;
  a processor; and
  a memory comprising instructions for a communication manager application, the instructions being executable by the processor to configure the smartphone device to:
    detect a connection or a coupling to a charging station;
    in response to the detection, configure the WLAN transceiver as a WLAN access point; and
    relay WLAN communication with a wireless local area network using the charging station.

Example 17: The smartphone device of example 16, wherein the instructions are executable by the processor to:
  form a mesh WLAN network with one or more other WLAN access points.

Example 18: The smartphone device of example 16 or example 17, wherein the instructions are executable by the processor to:
  join an existing WLAN network including a WLAN router, the WLAN router being connected to a broadband network.

Example 19: The smartphone device of example 18, wherein the broadband network connection of the WLAN router and a cellular network connection of the smartphone device are aggregated to provide data to an application executing on a user device.

Example 20: The smartphone device of example 18, wherein the broadband network connection of the WLAN router provides a redundant network connection for a cellular network connection of the smartphone device, or the cellular network connection of the smartphone device provides the redundant network connection for the broadband network connection of the WLAN router.

Although aspects of smartphone charging station connectivity have been described in language specific to features and/or methods, the subject of the appended claims is not necessarily limited to the specific features or methods described. Rather, the specific features and methods are disclosed as example implementations of smartphone charging station connectivity, and other equivalent features and methods are intended to be within the scope of the appended claims. Further, various different aspects are described, and it is to be appreciated that each described aspect can be implemented independently or in connection with one or more other described aspects.

What is claimed is:

1. A charging station device, comprising:
  wireless local area network (WLAN) radio circuitry, the WLAN radio circuitry comprising one or more antennas, a low-noise amplifier, power amplifiers, or any combination thereof;
  power and charging circuitry;
  a processor; and
  a memory comprising instructions for a docking manager application, the instructions being executable by the processor to configure the charging station to:
    detect a coupling or a connection to a user device;
    in response to detecting the coupling or the connection to the user device, configure the power and charging circuitry to charge a battery of the user device;
    configure the WLAN radio circuitry to relay at least some WLAN communications for the user device, the WLAN radio circuitry configured to provide a greater antenna gain than one or more antennas included in the user device; and
    relay at least some WLAN communications between the user device and one or more devices connected to a wireless local area network effective to enhance one or more of a range, reliability, or throughput of WLAN communications.

2. The charging station device of claim 1, wherein the WLAN radio circuitry further comprises one or more transmit-receive switches.

3. The charging station device of claim 2, wherein the WLAN radio circuitry comprises a WLAN signal sensor to sense a WLAN transmission from the user device, and the instructions being executable by the processor to configure the charging station device to:
  in response to the sensing of the WLAN transmission from the user device, configure the one or more transmit-receive switches to route the WLAN transmission from the user device through the power amplifier; and
  in response to not sensing the WLAN transmission from the user device, configure the one or more transmit-receive switches to route signals received by the one or more antennas through the low-noise amplifier.

4. The charging station device of claim 2, wherein the one or more antennas of the WLAN radio circuitry are configured to provide a greater antenna efficiency, antenna diversity, spatial diversity, or receive sensitivity than the one or more antennas included in the user device.

5. The charging station device of claim 2, wherein the WLAN radio circuitry comprises a WLAN transceiver and one or more additional antennas, and the instructions being executable by the processor to configure the charging station device to:
send and receive data for the user device using the WLAN transceiver and the one or more additional antennas.

6. The charging station device of claim 5, wherein the data is communicated between the charging station and the user device via a USB interface, a Near Field Communication link, or a Bluetooth communication link.

7. The charging station device of claim 5, further comprising a Fifth Generation New Radio (5G NR) femtocell, and the instructions being executable by the processor to configure the charging station to:
provide 5G NR wireless communication via a cellular backhaul of the user device, a WLAN network, or a combination thereof.

8. The charging station device of claim 1, further comprising a housing, wherein the housing includes mechanical features to mount the device to a window to improve transmission and reception of millimeter-wave radio signals, and wherein the mechanical features of the housing are configured to enable mounting the charging station using magnets, adhesive, adhesive tape, suction cups, or snaps.

9. A method relaying wireless local area network (WLAN) communication by a charging station, the method comprising:
detecting, by the charging station, a coupling or a connection to a user device;
in response to detecting the coupling or the connection to the user device, configuring power and charging circuitry to charge a battery of the user device;
configuring WLAN radio circuitry of the charging station to relay one or more WLAN communications sent and received to and from the user device, the WLAN radio circuitry configured to provide a greater antenna gain than one or more antennas included in the user device; and
relaying the one or more WLAN communications between the user device and one or more devices connected to a wireless local area network effective to enhance one or more or a range, reliability, or throughput of the one or more WLAN communications.

10. The method of claim 9, wherein the WLAN radio circuitry comprises one or more antennas, a low-noise amplifier, one or more transmit-receive switches, a power amplifier, or any combination thereof.

11. The method of claim 10, wherein the WLAN radio circuitry comprises a WLAN signal sensor to sense a WLAN transmission from the user device, the method further comprising:
in response to the sensing of the WLAN transmission from the user device, configuring the one or more transmit-receive switches to route the WLAN transmission from the user device through the power amplifier; and
in response to not sensing the WLAN transmission from the user device, configuring the one or more transmit-receive switches to route signals received by the one or more antennas through the low-noise amplifier.

12. The method of either claim 10, wherein the one or more antennas are configured to provide a greater antenna efficiency, antenna diversity, spatial diversity, or receive sensitivity than the one or more antennas included in the user device.

13. The method of claim 10, wherein the WLAN radio circuitry comprises a WLAN transceiver and one or more additional antennas, the method further comprising:
sending and receiving data for the user device using the WLAN transceiver and the one or more antennas.

14. The method of claim 13, wherein the data is communicated between the charging station and the user device via a USB interface, a Near Field Communication link, or a Bluetooth communication link.

15. The method of claim 14, wherein the charging station further comprises a Fifth Generation New Radio (5G NR) femtocell, the method further comprising:
providing 5G NR wireless communication via a cellular backhaul of the user device, a WLAN or a combination thereof.

16. A user device comprising:
a wireless local area network (WLAN) transceiver;
a processor; and
a memory comprising instructions for a communication manager application, the instructions being executable by the processor to configure the user device to:
detect a connection or a coupling of the user device to a charging station;
in response to the detection, configure the WLAN transceiver as a WLAN access point; and
relay one or more WLAN communications with a wireless local area network using the charging station, the charging station having WLAN radio circuitry configured to provide a greater antenna gain than one or more antennas included in the user device.

17. The user device of claim 16, wherein the instructions are executable by the processor to:
form a mesh WLAN with one or more other WLAN access points.

18. The user device of claim 17, wherein the instructions are executable by the processor to:
join an existing WLAN including a WLAN router, the WLAN router being connected to a broadband network.

19. The user device of claim 18, wherein the broadband network connection of the WLAN router and a cellular network connection of the user device are aggregated to provide data to an application executing on a user device.

20. The user device of claim 18, wherein the broadband network connection of the WLAN router provides a redundant network connection for a cellular network connection of the user device, or the cellular network connection of the user device provides the redundant network connection for the broadband network connection of the WLAN router.

* * * * *